(No Model.) 2 Sheets—Sheet 1.

G. H. WEBB.
DEVICE FOR TRIMMING NUTS.

No. 246,256. Patented Aug. 23, 1881.

WITNESSES:
J. A. Miller Jr
Wm L. Cox

INVENTOR:
George H. Webb
by Joseph A. Miller
atty (No Model.) 2 Sheets—Sheet 2.

G. H. WEBB.
DEVICE FOR TRIMMING NUTS.

No. 246,256. Patented Aug. 23, 1881.

WITNESSES:
J. A. Miller Jr
Wm L. Cook

INVENTOR:
George H. Webb
by Joseph A. Miller atty

N. PETERS. Photo-Lithographer. Washington, D. C.

UNITED STATES PATENT OFFICE.

GEORGE H. WEBB, OF PAWTUCKET, RHODE ISLAND.

DEVICE FOR TRIMMING NUTS.

SPECIFICATION forming part of Letters Patent No. 246,256, dated August 23, 1881.

Application filed March 9, 1881. (No model.)

*To all whom it may concern:*

Be it known that I, GEORGE H. WEBB, of Pawtucket, in the county of Providence and State of Rhode Island, have invented a new and useful Improvement in Machines for Trimming Bolt-Nuts; and I hereby declare that the following is a full, clear, and exact description of the same, reference being had to the accompanying drawings, forming part of this specification.

This invention has reference to an improvement in machines for trimming the sides of bolt-nuts; and it consists in providing the follower, by which the nut-blank is forced through the die, with a yielding guide, as will be more fully set forth hereinafter.

In machines for trimming nuts or nut-blanks a reciprocating follower is used to force the nut or nut-blank through a die the upper edge of which is kept clean and sharp, so as to strip away any surplus metal and give to the sides a clean and finished surface. The nut in such machines is usually placed on the end of the follower and allowed to descend with the same, the tapering end of the guide entering the hole in the nut-blank.

Figure 2:
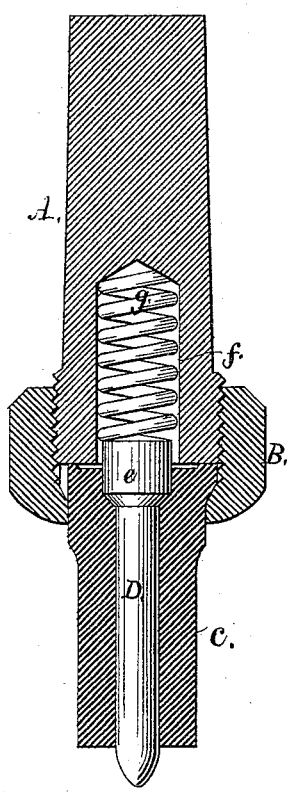
Figure 1:
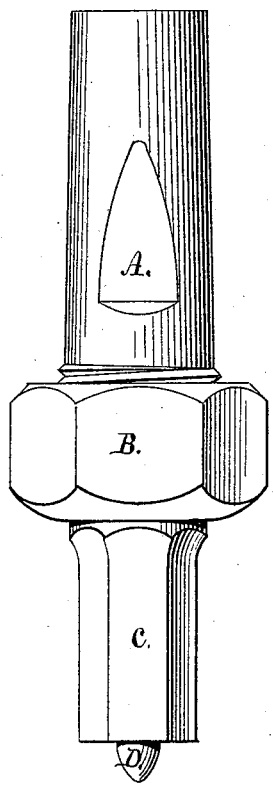
Figure 3:
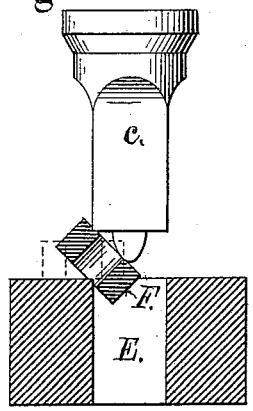
Figure 4:
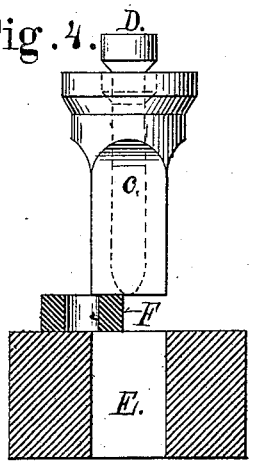
Figure 5:
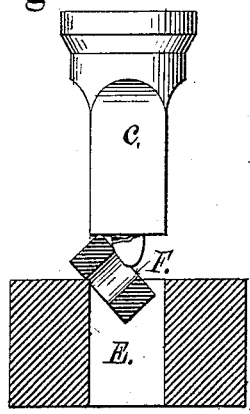
Figure 6:
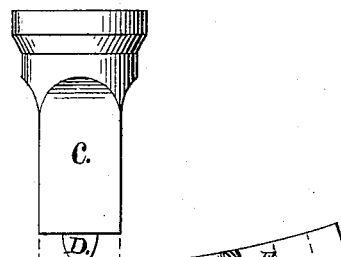
Figure 7:
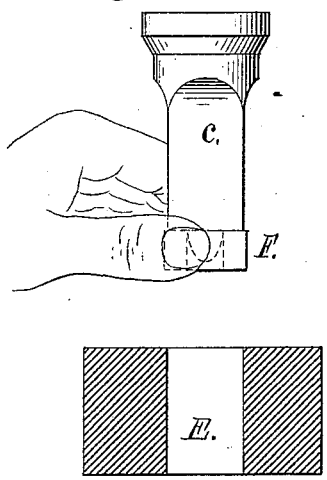
Figure 8:
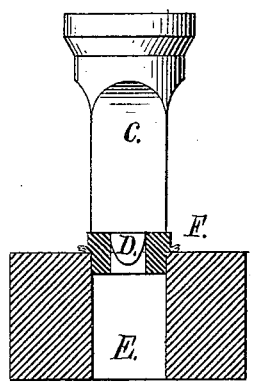

Figure 1 is a view of the follower provided with a yielding center. Fig. 2 is a sectional view of the same, showing the yielding center held in place by a coiled spring. Fig. 3 is a view showing the follower, the die, and a nut placed on one side of the center. Fig. 4 shows the effect when the center can yield to a nut not placed fairly in the center of the die. Fig. 5 shows the effect on a fixed center when the nut is not fairly placed. Fig. 6 shows the center of the follower placed on the solid part of the nut. Fig. 7 represents a nut as being placed under the follower as the same descends, and Fig. 8 shows the follower pushing a nut through the die to strip the sides of a nut or trim it.

Similar letters of reference indicate corresponding parts.

When, in machines for trimming or stripping nuts, the center of the follower which forms the guide is fixed and unyielding, as has been the case heretofore, and a nut is presented between the die and follower not centrally, so that the guide or center can enter the hole in the nut, the nut is canted, as is shown in Figs. 3 and 5, and the center is liable to be broken off, as is shown in Fig. 5, and both the follower and the die are liable to injury.

In the drawings, A is the holder, to which the follower C is connected by means of the nut B. C is the follower, and D the yielding center resisted by the coiled spring $g$. E is the die, and F the nut to be stripped.

By the use of the yielding center in a nut-trimming machine time, labor, and repairs are saved, and the product of the machine increased.

Being aware of United States Patent No. 184,161, I do not broadly claim a yielding center.

Having thus described my invention, I claim as new and desire to secure by Letters Patent—

1. In a machine for trimming nuts, the combination, with the die, of a follower provided with a yielding center, in diameter substantially the same as the nut-hole and formed with a cone-like or oval point, as described.

2. The combination, with the holder A, of the follower C, the coiled spring $g$, and the nut B, constructed to operate in connection with the die E to strip or trim nut-blanks, as described.

GEORGE H. WEBB.

Witnesses:
JOSEPH A. MILLER,
JOSEPH A. MILLER, Jr.